No. 686,600. Patented Nov. 12, 1901.
E. R. FELLOWS.
HACKSAW.
(Application filed June 25, 1900.)
(No Model.)
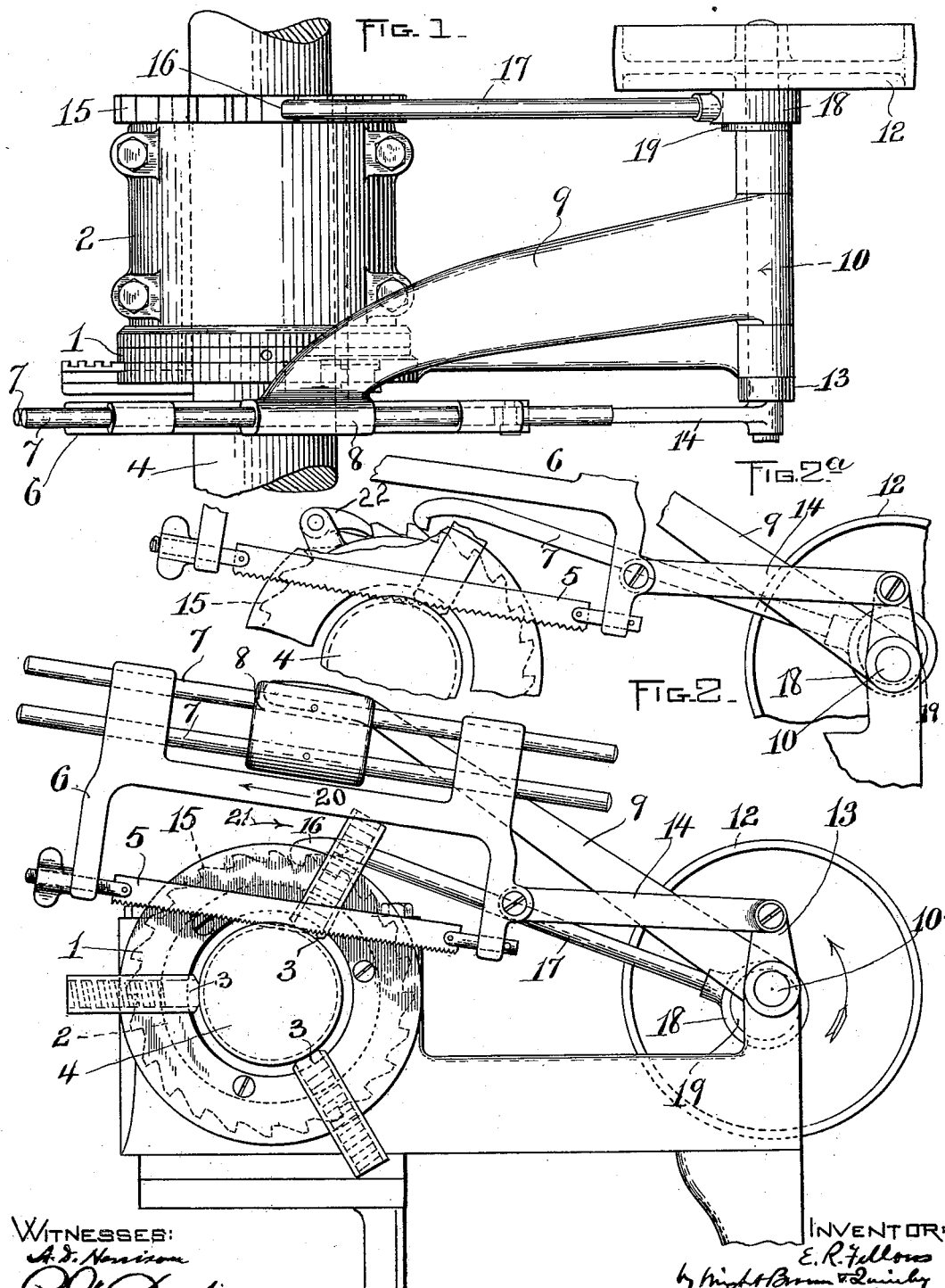
WITNESSES:
INVENTOR:
E. R. Fellows

UNITED STATES PATENT OFFICE.

EDWIN R. FELLOWS, OF SPRINGFIELD, VERMONT.

HACKSAW.

SPECIFICATION forming part of Letters Patent No. 686,600, dated November 12, 1901.

Application filed June 25, 1900. Serial No. 21,411. (No model.)

*To all whom it may concern:*

Be it known that I, EDWIN R. FELLOWS, of Springfield, in the county of Windsor and State of Vermont, have invented certain new and useful Improvements in Hacksaws, of which the following is a specification.

This invention relates to hacksaws for cutting rods or bars of metal into short lengths or sections; and it has for its object to provide a hacksawing-machine adapted to automatically rotate the work during the cutting operation, to the end that the saw may make a kerf extending entirely around the rod or bar and progressing inwardly from the periphery to the center, thus facilitating the cutting operation and preventing the saw from running or making an oblique cut.

The invention consists in the improvements which I will now proceed to describe and claim.

Of the accompanying drawings, forming a part of this specification, Figure 1 represents a top view of a hacksawing-machine embodying my invention. Fig. 2 represents an end view of the same. Fig. 2ª represents an end elevation, partly broken away, showing a modification.

The same reference characters indicate the same parts in all the figures.

Referring to Figs. 1 and 2, 1 represents a work-holding chuck adapted to be rotated in a fixed bearing 2 and provided with jaws 3, adapted to grasp a rod 4, which is to be sawed.

5 represents a hacksaw affixed to a reciprocating frame or carrier 6, which is movable upon guides 7 7, affixed to a block or head 8, which is formed upon an arm 9, adapted to oscillate in a vertical plane on a shaft 10, which is journaled in bearings in the supporting-frame. The shaft 10 is rotated by power suitably applied, as by a belt running from a driving-shaft upon a pulley 12, affixed to the shaft. The saw is reciprocated by means of a crank-arm 13, affixed to the shaft 10, and a connecting-rod 14, connecting the wrist-pin of said crank-arm with the saw-frame 6, the saw being permitted to gradually descend as it enters the work by the gravitating movement of the guides 7 7, block 8, and arm 9. The chuck 1 is provided at its rear end with a ratchet 15, which is rotated step by step by means of a pawl 16, formed on or attached to a rod 17, having a strap 18, which surrounds an eccentric 19, affixed to the shaft 10.

In the embodiment of my invention shown in Fig. 2 the centers of crank-arm 13 and the eccentric 19 are located at opposite sides of the shaft 10, the arrangement being such that when the saw is moving forward in the direction of arrow 20, Fig. 2, the pawl 16 is moving in the opposite direction, as indicated by the arrow 21. Hence the chuck is partly rotated during the forward stroke of the saw. During the backward stroke of the saw the pawl 16 moves forward to take a fresh hold, and rotation of the chuck by the backward movement of the saw is prevented by the friction attending the contact between the chuck and its bearing 2, it being unnecessary to provide a pawl or other device to prevent backward rotation of the chuck.

In Fig. 2ª I show a modification in which the centers of the crank-arm and eccentric are at the same side of the shaft, so that the rotation of the chuck takes place during the backward movement of the saw. In this case a stop-pawl 22 is provided to prevent the backward rotation of the chuck.

I claim—

1. A sawing-machine comprising a rotatively-mounted work-holding chuck having a ratchet, a reciprocatory saw, a movable support for the saw having means for guiding the reciprocating movements of the saw, a driving-shaft, connections between the shaft and saw for reciprocating the latter, a pawl engaging the ratchet, and connections between the pawl and the driving-shaft for reciprocating the pawl, the latter being formed to impart a step-by-step rotation in one direction to the chuck.

2. A sawing-machine comprising a rotatively-mounted work-holding chuck having a ratchet, a reciprocatory saw, a movable support for the saw having means for guiding the reciprocating movements of the saw, a driving-shaft, connections between the shaft and saw for reciprocating the latter, a pawl engaging the ratchet, connections between the pawl and the driving-shaft for reciprocating the pawl, the latter being formed to impart a step-by-step rotation in one direction to the chuck, and a stop-pawl formed to coöperate with the ratchet in preventing rotation of the chuck in the opposite direction.

In testimony whereof I have affixed my signature in presence of two witnesses.

EDWIN R. FELLOWS.

Witnesses:
R. M. PIERSON,
M. B. MAY.